US012607064B1

(12) United States Patent
Chen

(10) Patent No.: US 12,607,064 B1
(45) Date of Patent: Apr. 21, 2026

(54) SINGLE HANDRAIL TELESCOPIC LADDER

(71) Applicant: Miaoren Chen, Jinhua (CN)

(72) Inventor: Miaoren Chen, Jinhua (CN)

( * ) Notice: Subject to any disclaimer, the term of this patent is extended or adjusted under 35 U.S.C. 154(b) by 0 days.

(21) Appl. No.: 19/321,113

(22) Filed: Sep. 5, 2025

(30) Foreign Application Priority Data

Sep. 2, 2025 (CN) ......................... 202511243188.7

(51) Int. Cl.

| | |
|---|---|
| ***E06C 1/22*** | (2006.01) |
| ***E06C 7/04*** | (2006.01) |
| ***E06C 7/18*** | (2006.01) |
| ***E06C 7/50*** | (2006.01) |

(52) U.S. Cl.

CPC .................. *E06C 1/22* (2013.01); *E06C 7/04* (2013.01); *E06C 7/50* (2013.01)

(58) Field of Classification Search

CPC ..... E06C 1/22; E06C 1/14; E06C 1/38; E06C 1/387; E06C 7/04; E06C 7/181; E06C 7/182; E06C 7/50; A47C 12/00

See application file for complete search history.

(56) References Cited

U.S. PATENT DOCUMENTS 2,467,800 A * 4/1949 Backlin ................... E06C 7/182 182/106
4,546,855 A * 10/1985 Lyons ..................... E06C 7/182 182/8
7,383,920 B2 * 6/2008 Meeker ..................... E06C 7/14 182/129
10,435,949 B2 * 10/2019 Christianson ............. E06C 7/50
10,844,660 B2 * 11/2020 Leng ........................ E06C 1/387
11,319,751 B2 * 5/2022 Zhu ........................... E06C 1/22
11,459,824 B2 * 10/2022 Cohen ........................ E06C 7/14
11,578,533 B2 * 2/2023 Fortier .................... F16B 7/105
11,753,868 B2 * 9/2023 Boyer ..................... E06C 7/182 182/106
2023/0287739 A1 * 9/2023 Dong ......................... E06C 1/18
2024/0301752 A1 * 9/2024 Leng .......................... E06C 1/20
2025/0283378 A1 * 9/2025 Leng .......................... E06C 7/50

* cited by examiner

*Primary Examiner* — David E Martinez
(74) *Attorney, Agent, or Firm* — Birchwood IP

(57) ABSTRACT

A single handrail telescopic ladder is provided. Which includes front tubes and rear tubes that are hinged to each other at a top; a single handrail tube that is scalability inserted into one of the front tubes; the front tubes are provided with a fixing hole, and a locking hole corresponding to the fixing hole is provided at a corresponding position of the single handrail tube; locking members pass through the fixing hole and the locking hole when the single handrail tube is pulled out from the front tubes to a predetermined position; and an elastic member that directly or indirectly acts on the locking members and provides a pre-tension force for the locking member; when the locking members are unlocked, the locking members exit from the fixing hole and/or locking hole, allowing the single handrail tube to automatically retract into the front tubes.

2 Claims, 11 Drawing Sheets

SINGLE HANDRAIL TELESCOPIC LADDER

CROSS-REFERENCE TO RELATED APPLICATIONS

This application claims priority to Chinese Patent Application No. 202511243188.7, filed on Sep. 2, 2025, which is hereby incorporated by reference in its entirety.

TECHNICAL FIELD

The present disclosure relates to the field of ladder technologies, and in particular, to a single handrail telescopic ladder.

BACKGROUND

As a common daily tool, a ladder usually consists of two long bars as a main body, with several horizontal bars crossing a middle for climbing. Its main function is to assist users in high-altitude operations. In daily use, foldable ladders are widely used due to their ease of storage. However, these types of ladders often lack handrail design when unfolded, resulting in users having nowhere to hold them and easily losing balance, and posing a certain safety risk.

If fixing handrails are installed on this type of ladder, although it can improve the stability of use, the foldable ladder needs to consider the function of folding and storage, and the handrail structure is often difficult to store properly. Instead, it will increase the overall volume, resulting in an increase in the height of the ladder after folding, which not only occupies storage space, but also is not conducive to packaging and transportation.

SUMMARY

To address the shortcomings of existing technology, a single handrail telescopic ladder is provided that is convenient for storing handrails after folding the ladder, thereby facilitating the overall packaging and transportation of the ladder.

The present disclosure is implemented using the following technical solution: a single handrail telescopic ladder, including:

- two pairs of front tubes and two pairs of rear tubes, where the front tubes and the rear tubes are hinged to each other at a top; pedals for a user to step on are provided between adjacent front tubes and between adjacent rear tubes;
- a single handrail tube, which is scalability inserted into one of the front tubes;
- the front tubes are provided with a fixing hole that penetrates both inside and outside, and a locking hole corresponding to the fixing hole is provided at a corresponding position of the single handrail tube;
- locking members, which simultaneously pass through the fixing hole and the locking hole when the single handrail tube is pulled out from the front tubes to a predetermined position, thereby achieving a fixation between the single handrail tube and the front tubes; and
- an elastic member, which directly or indirectly acts on the locking members and provides a pre-tension force for the locking members towards a direction passing through the fixing hole and the locking hole;

- when the locking members are unlocked, the locking members exit from the fixing hole and/or locking hole, allowing the single handrail tube to automatically retract into the front tubes.

When a user needs to use the ladder, he can directly pull out the single handrail tube upwards, after pulling at a predetermined position, the locking members will automatically pass through the fixing hole and locking hole under the action of the elastic member, thus completing the fixation of the single handrail tube. At this time, the user can grasp the single handrail tube. When the ladder needs to be folded for stored, the user can apply external force to the locking members after folding the ladder for storage. After operating the locking members to withdraw from the fixing hole and/or locking hole, the single handrail will automatically retract into the front tubes after losing the support of the locking member, completing the storage of the single handrail tube.

In some embodiments of the present disclosure, an installation seat is fixedly provided on an outer wall of the front tubes with the single handrail tube, and the locking members are provided on the installation seat and is a pull ring pin; where the pull ring pin includes a circular pull ring provided on an outer side of the installation seat and a pin shaft provided on an inner side of the installation seat and insertable into the fixing hole and locking hole; the elastic member is provided inside the installation seat and is configured to apply a pre-tension force for the pull ring pin towards an inner side of the ladder.

When unlocking the single handrail tube, the user only needs to pull the circular pull ring of the pull ring pin outward, so as to achieve a movement of the pin shaft, the pin shaft is caused to at least exit from the locking hole of the single handrail tube, thus completing an automatic retraction of the single handrail tube into the front tubes without the support of the pin shaft.

In some embodiments of the present disclosure, the pin shaft includes a thick section and a thin section, a step surface is formed between the thick section and the thin section, where the elastic member is a spring, and the spring is sleeved on the thin section, one end of the spring is in contact with the step surface, and the other end of the spring is in contact with an inner wall of the installation seat, thereby applying the pre-tension force for the pull ring pin towards the inner side of the ladder.

The above settings can make the elastic force on the pin shaft more stable during movement, and the spring will not shift.

In some embodiments of the present disclosure, an installation seat is fixedly provided on an outer wall of the front tubes with the single handrail tube, and a button is provided on the installation seat; a middle of the button is provided with an arc-shaped protrusion extending towards the installation seat, an outer side of a front end of the arc-shaped protrusion is provided with a chamfered slope, a middle of the arc-shaped protrusion is provided with a rotating shaft hole; the installation seat is provided with a rotating shaft passing through the rotating shaft hole, so that the button is rotatably connected to the installation seat; one end of the button is provided with locking members that are inserted into the fixing hole and the locking hole, and the other end of the button interacts with the elastic member, where the elastic member is a spring, and the spring applies elastic force to the other end of the button, so that the button is caused to rotate around a middle and the locking members are driven to have a pre-tension force to move in a direction passing through the fixing hole and the locking hole.

When unlocking the single handrail tube, the user only needs to press one end of the button with the spring, the button is caused to rotate around its middle, so that the locking members at least exit from the locking hole of the single handrail tube, thereby completing the automatic retraction of the single handrail tube into the front tubes without the support of the pin shaft. Where the chamfered slope can facilitate an assembly between the button and the installation seat.

In some embodiments of the present disclosure, a guide structure is provided between the button and the installation seat, and the guide structure is provided with a guide hole configured for an end of the spring to insert and a guide protrusion configured for the other end of the spring to be sleeved.

The button will rotate around its center, so by providing the guide hole and guide protrusion, two ends of the spring can be limited to ensure that the spring can always be in contact with the button.

In some embodiments of the present disclosure, the rear tubes are directly hinged to the installation seat.

Through the above settings, the structure can be more compact, and the rear tubes can be directly hinged to the installation seat. The installation seat not only installs the locking members, but also can be hinged to the rear tubes, thereby saving production costs.

In some embodiments of the present disclosure, the locking members are all provided at positions where the installation seat is located on the inner side of the ladder.

When standing on the ladder, the user faces the ladder, so the line of sight is located on the inner side of the ladder. Providing the locking members at the positions where the installation seat is located on the inner side of the ladder can facilitate the user to quickly find and unlock the locking member. The user can see and press the button more quickly or pull the push the pull ring pin more quickly.

In some embodiments of the present disclosure, a pressing plate is provided on a wall of the front tubes facing the rear tubes, and a middle of the pressing plate is rotatably connected to the front tubes; an inner side of one end of the pressing plate is provided with the locking members, and an inner side of the other end of the pressing plate is provided with the elastic member, and the elastic member is a spring; the spring applies elastic force to the pressing plate, and the pressing plate is caused to rotate around its middle, and the locking members are driven to have a pre-tension force that moves in a direction passing through the fixing hole and the locking hole;

when the ladder is folded, the front tubes and rear tubes are combined to compress the pressing plate to overcome the pre-tension force of the spring, so that the locking members at least exit from the locking hole of the single handrail tube.

By the above setting ways, when the ladder is folded, the locking of the single handrail tube can be automatically released due to a closure of the rear tubes and front tubes, without the need for the user to unlock the locking members, which is more convenient.

In some embodiments of the present disclosure, one side of the front tubes corresponding to the pressing plate is provided with a limit protrusion extending towards the pressing plate, the spring is sleeved on the limit protrusion, the pressing plate is provided with an avoidance hole at a position corresponding to the limit protrusion, a length of the limit protrusion is less than or equal to a thickness of the pressing plate.

The limit protrusion can guide the elastic expansion and contraction of the spring, thereby avoiding spring displacement. At the same time, after the pressing plate is compressed again, the avoidance hole can avoid the limit protrusion.

In some embodiments of the present disclosure, a pressing plate is provided on a wall of the front tubes facing the rear tubes, one end of the pressing plate is rotatably connected to the front tubes, an inner side of the other end of the pressing plate is provided with a contact protrusion extending towards the front tubes; the locking members and the elastic member are provided inside the single handrail tube, the locking members pass through the locking hole and the fixing hole from inside to outside and extend to an outside of the front tubes to contact with the contact protrusion;

after the ladder is folded, the front tubes and rear tubes are combined to compress the pressing plate, and the contact protrusion is caused to compress the locking members inward to overcome the pre-tension force of the elastic member, so that the locking members at least exit from the fixing hole of the front tubes.

By the above setting ways, when the ladder is folded, the locking of the single handrail tube can be automatically released due to the closure of the rear tubes and front tubes, without the need for the user to contact the locking member, which is more convenient.

In some embodiments of the present disclosure, the elastic member is a V-shaped leaf spring, the locking members are protrusions provided on the leaf spring, and the locking members are integrally formed with the leaf spring.

In some embodiments of the present disclosure, the pressing plate is a U-shaped structure adapted to an outer wall contour of the front tubes, two opposite side walls of the U-shaped pressing plate are provided with convex shafts inserted into the front tubes and rotatably connected with the front tubes.

The above settings render the structure more compact.

In some embodiments of the present disclosure, the single handrail tube is hollow.

Compared with the existing technology, the present disclosure has advantages of contraction and storing the single handrail when the ladder is not in use, thereby reducing a storage space occupied by the single handrail, thereby facilitating packaging and transportation, and the unlocking way for the single handrail storage is relatively simple, which is convenient for users to operate.

Numeral reference: 1—front tube; 11—fixing hole; 2—rear tube; 3—pedal; 4—installation seat; 41—rotating shaft; 5—locking member; 51—circular pull ring; 52—pin shaft; 521—thin section; 522—thick section; 523—step surface; 53—spring; 54—leaf spring; 6—single handrail tube; 61—locking hole; 7—button; 71—shaft hole; 72—guide protrusion; 73—guide hole; 74—chamfered slope; 75—arc-shaped protrusion; 8—pressing plate; 81—avoidance hole; 82—limit protrusion; 83—convex shaft; 84—contact protrusion.

DESCRIPTION OF EMBODIMENTS

The present disclosure will be further described based on the accompanying drawings and specific embodiments.

Figure 1:
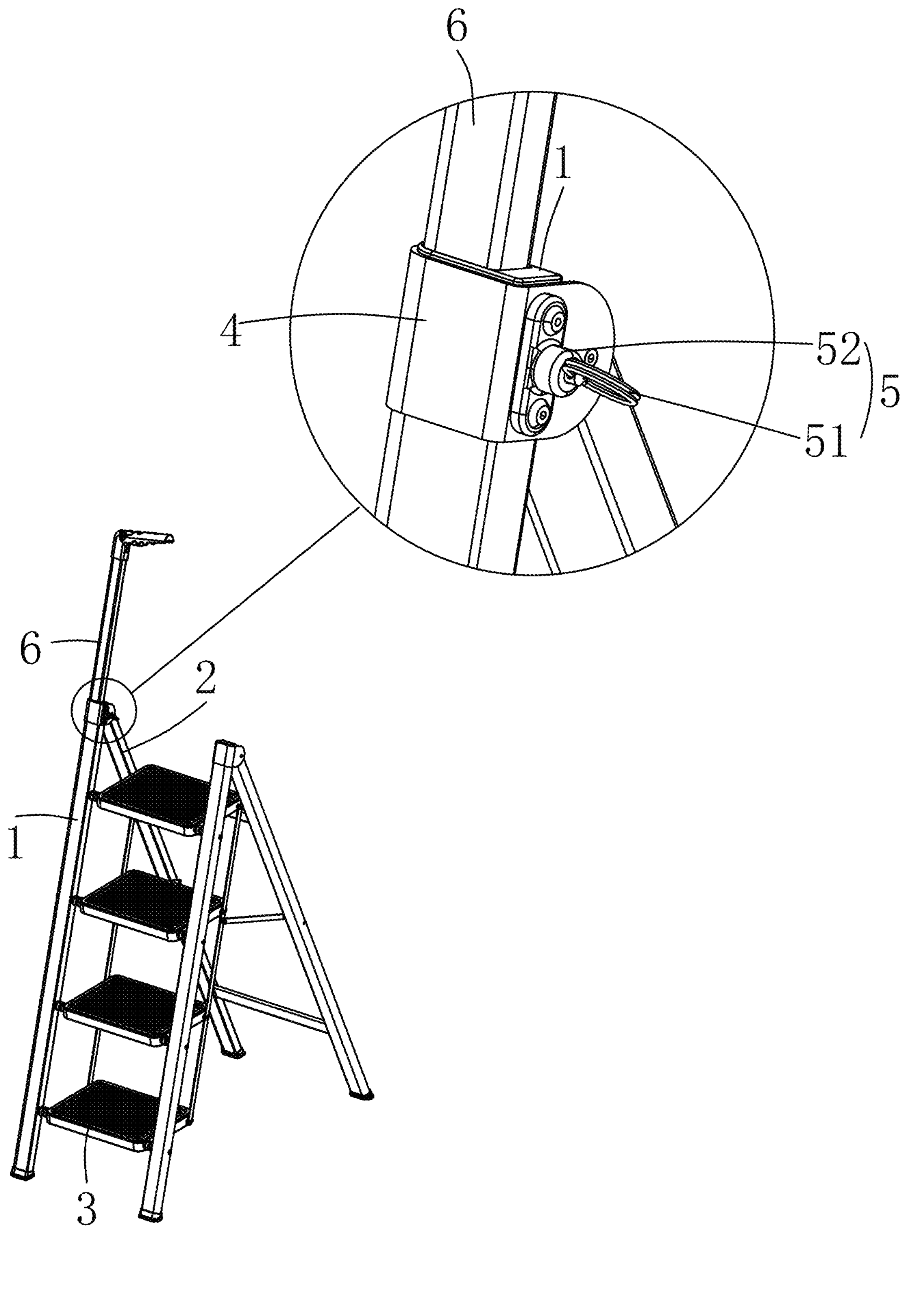
FIG. 1 is a schematic structural diagram of a ladder in an embodiment.
Figure 2:
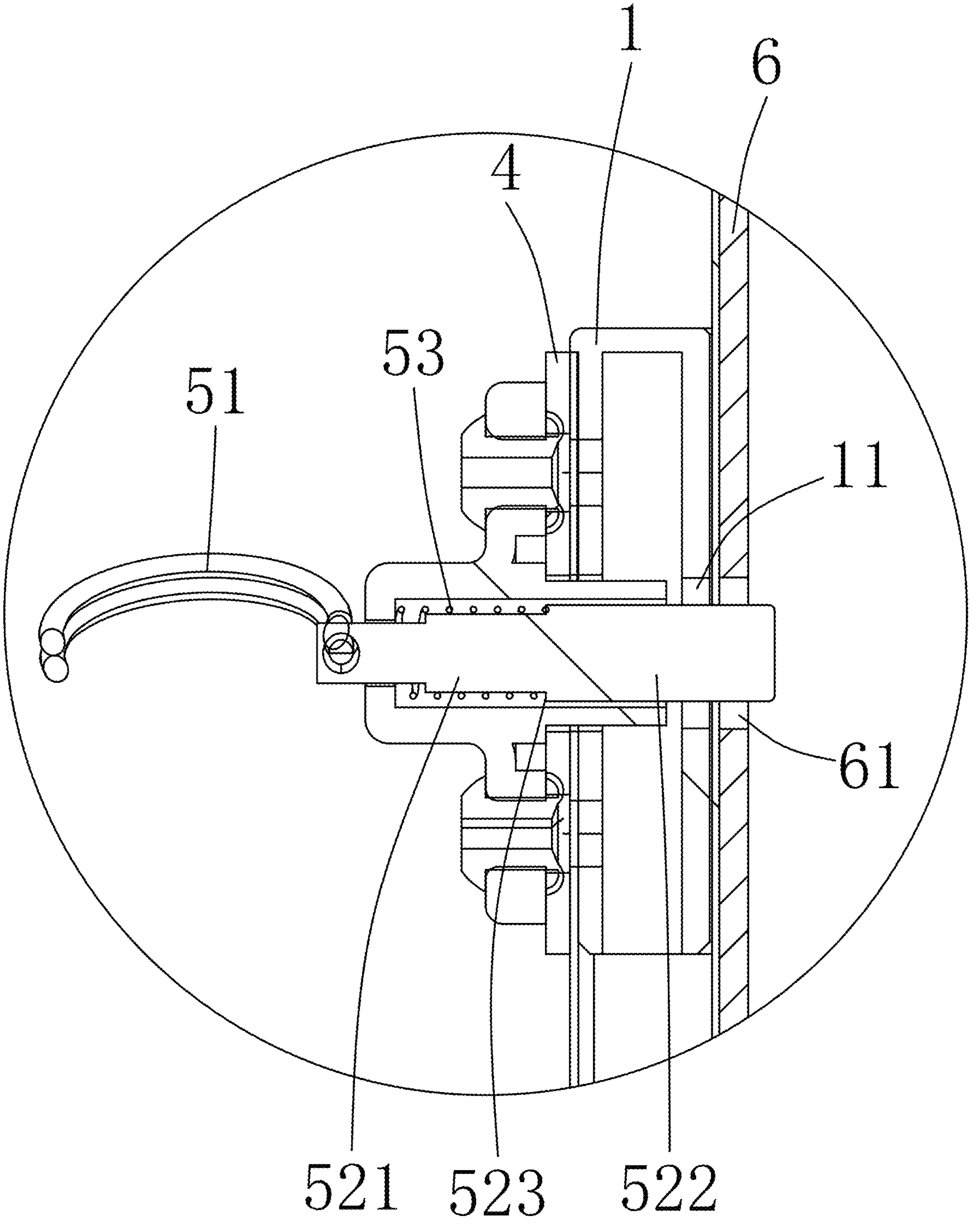
FIG. 2 is a sectional view of an installation seat in an embodiment.
Figure 3:
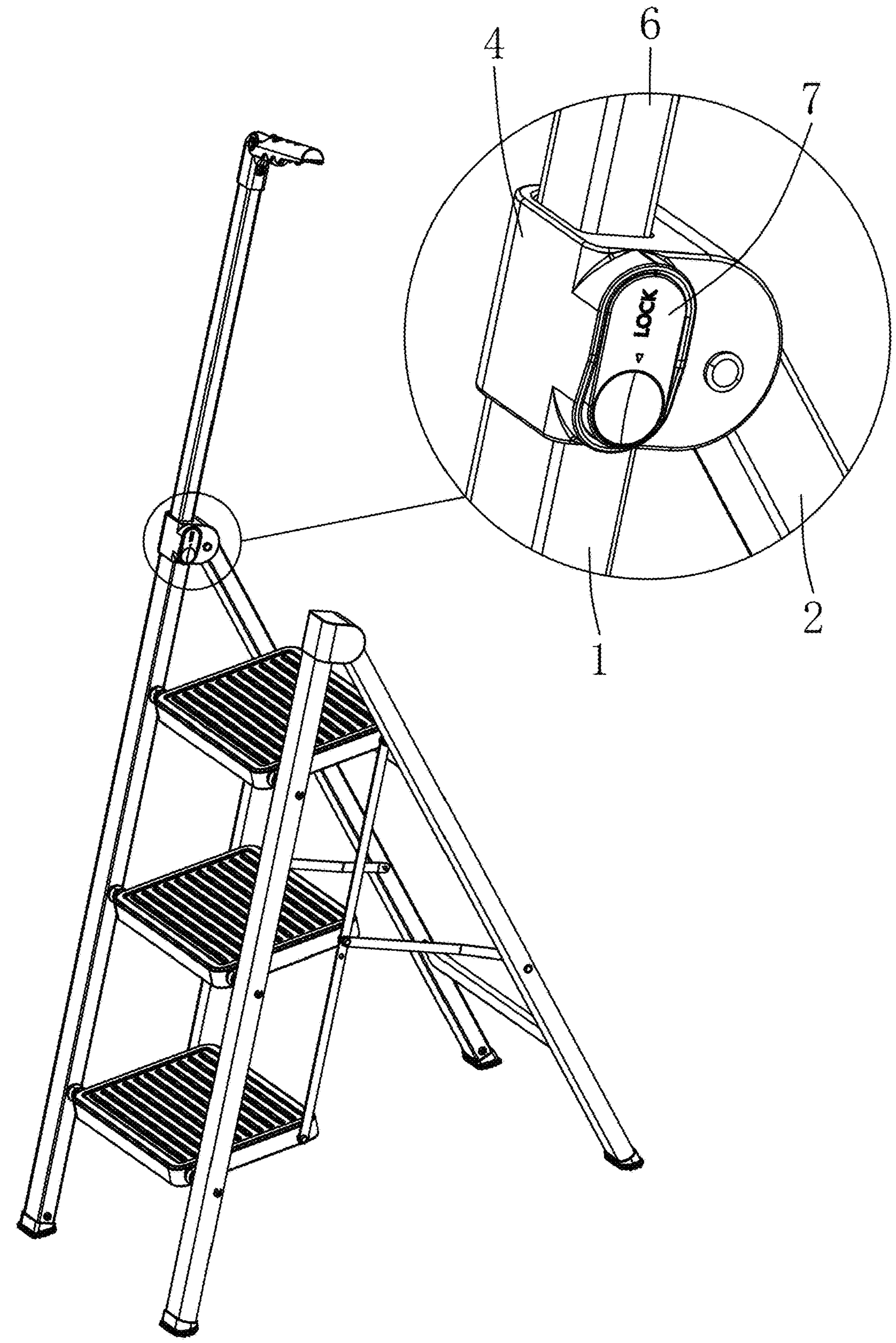
FIG. 3 is a schematic structural diagram of a ladder in another embodiment.
Figure 4:
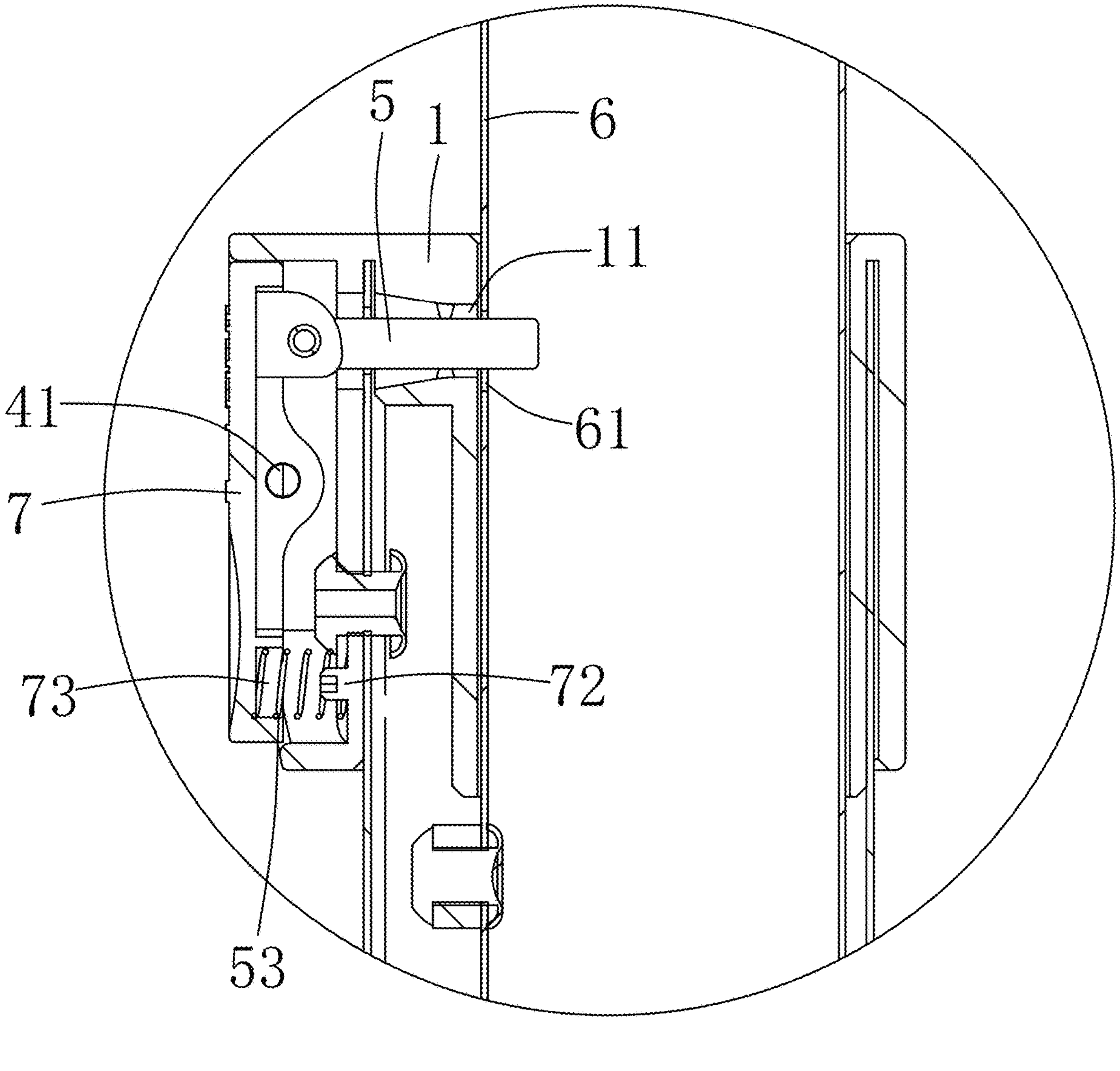
FIG. 4 is a sectional view of an installation seat in another embodiment.
Figure 5:
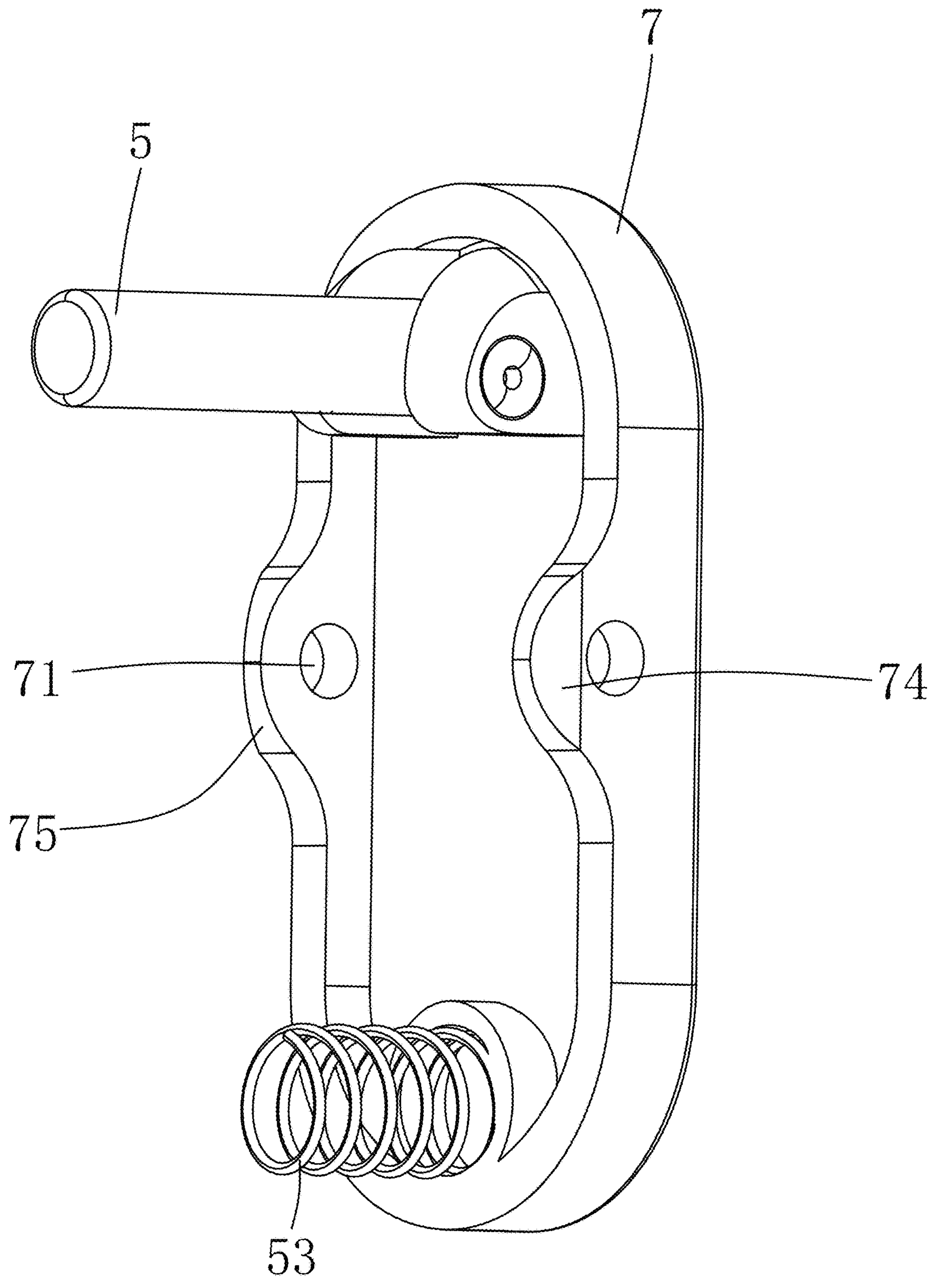
FIG. 5 is a schematic structural diagram of a button.
Figure 6:
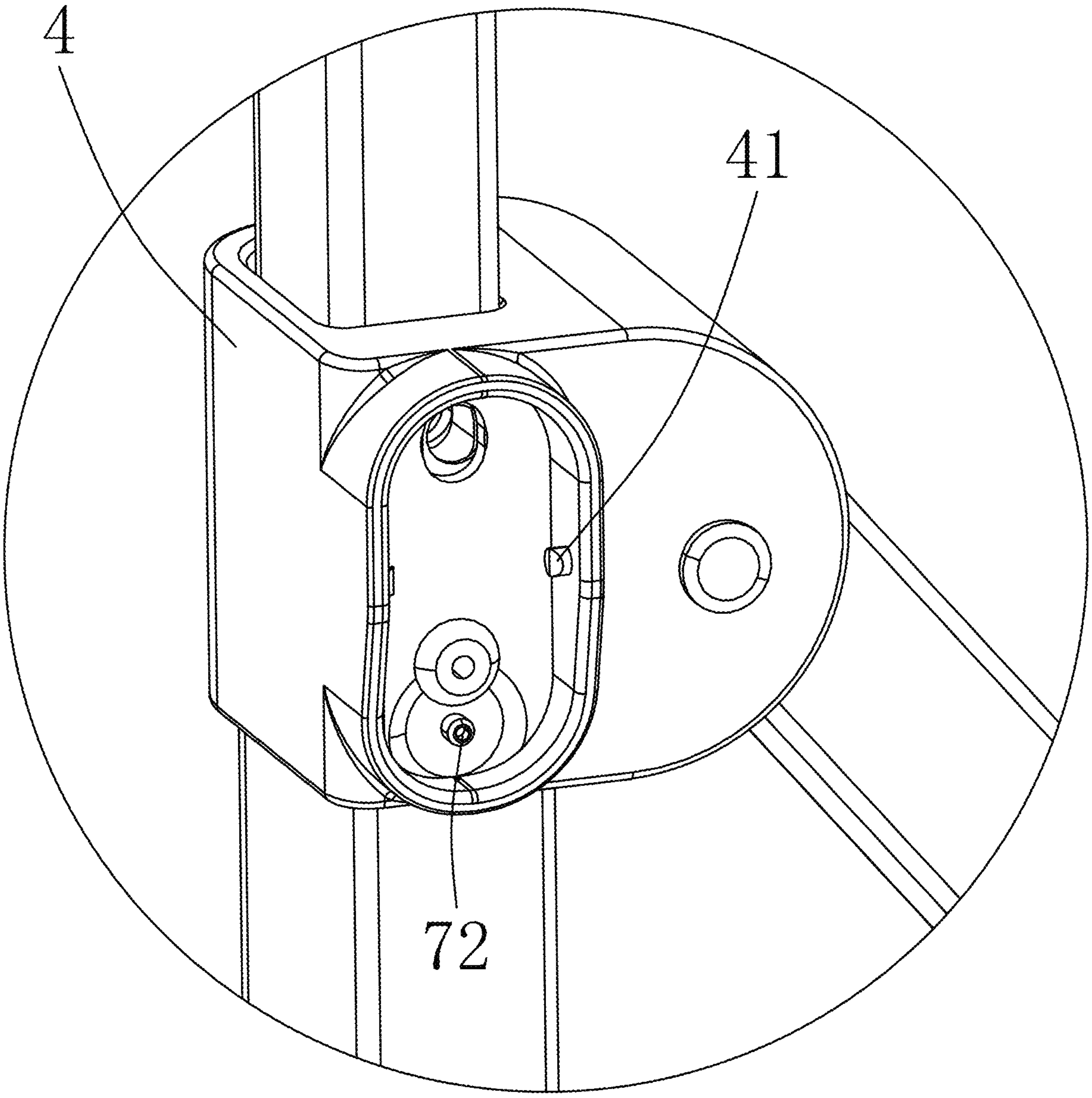
FIG. 6 is a schematic structural diagram of the installation seat after removing the button.
Figure 7:
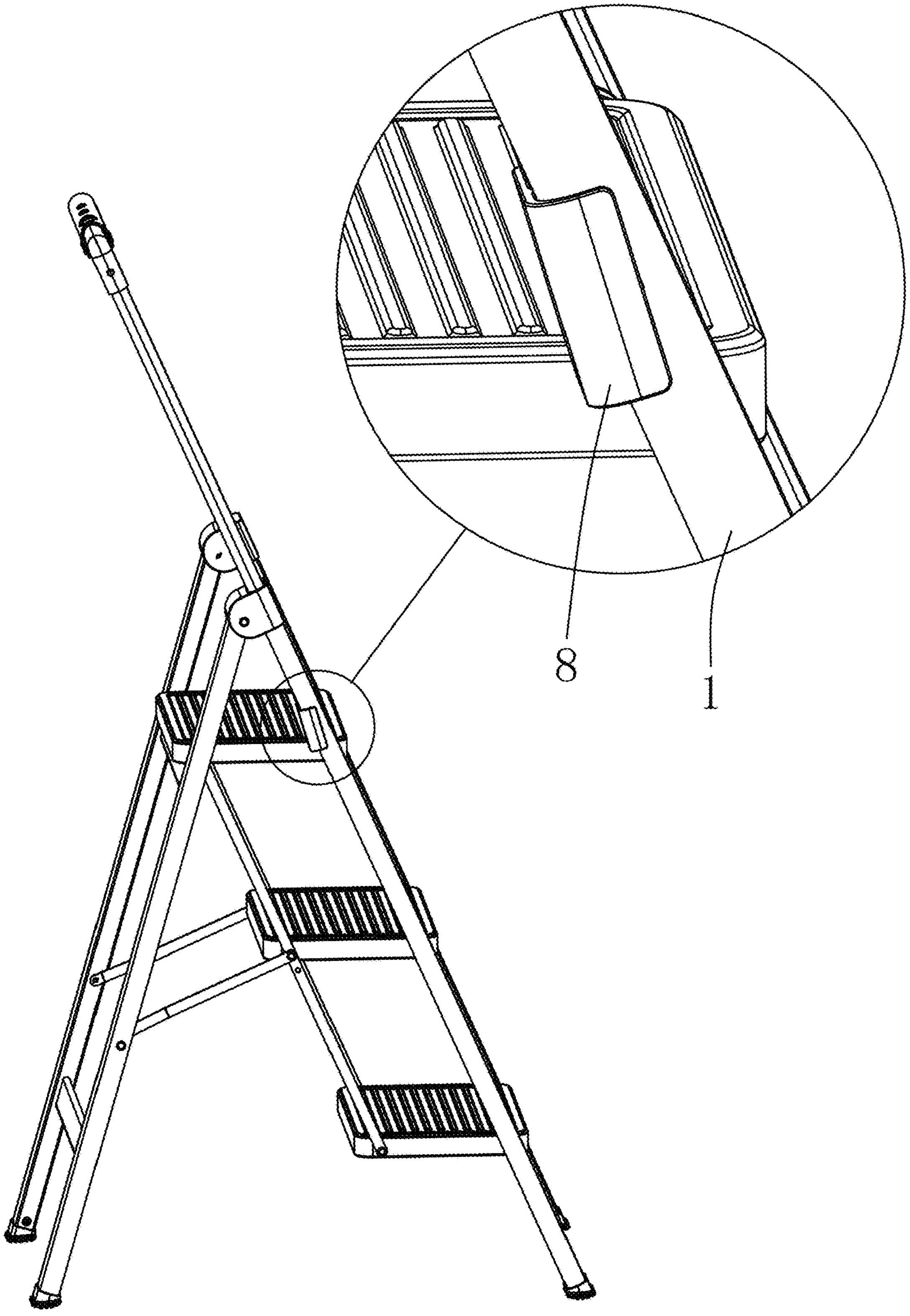
FIG. 7 is a schematic structural diagram using a pressing plate in yet one embodiment.
Figure 8:
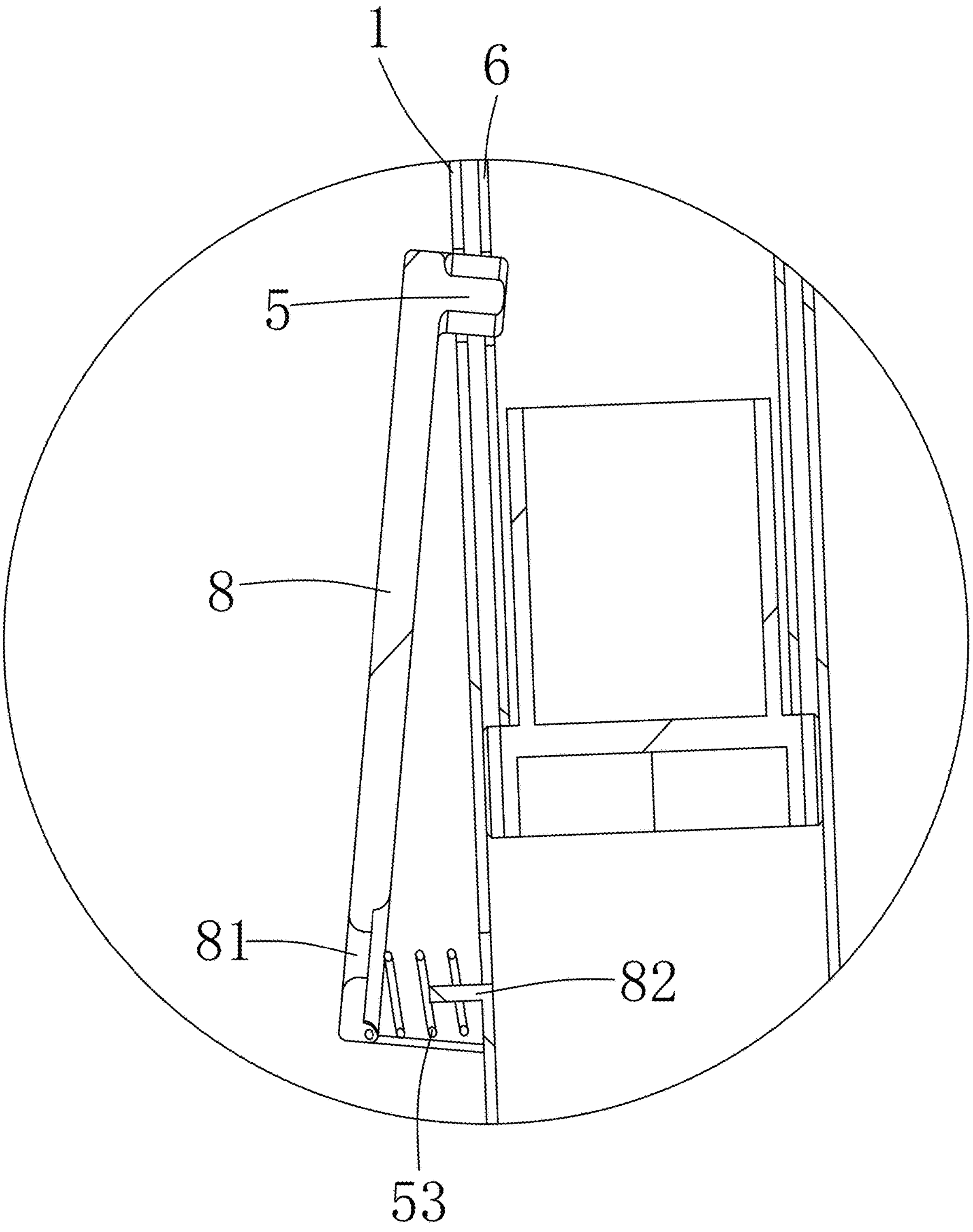
FIG. 8 is a sectional view of the pressing plate in FIG. 7.
Figure 9:
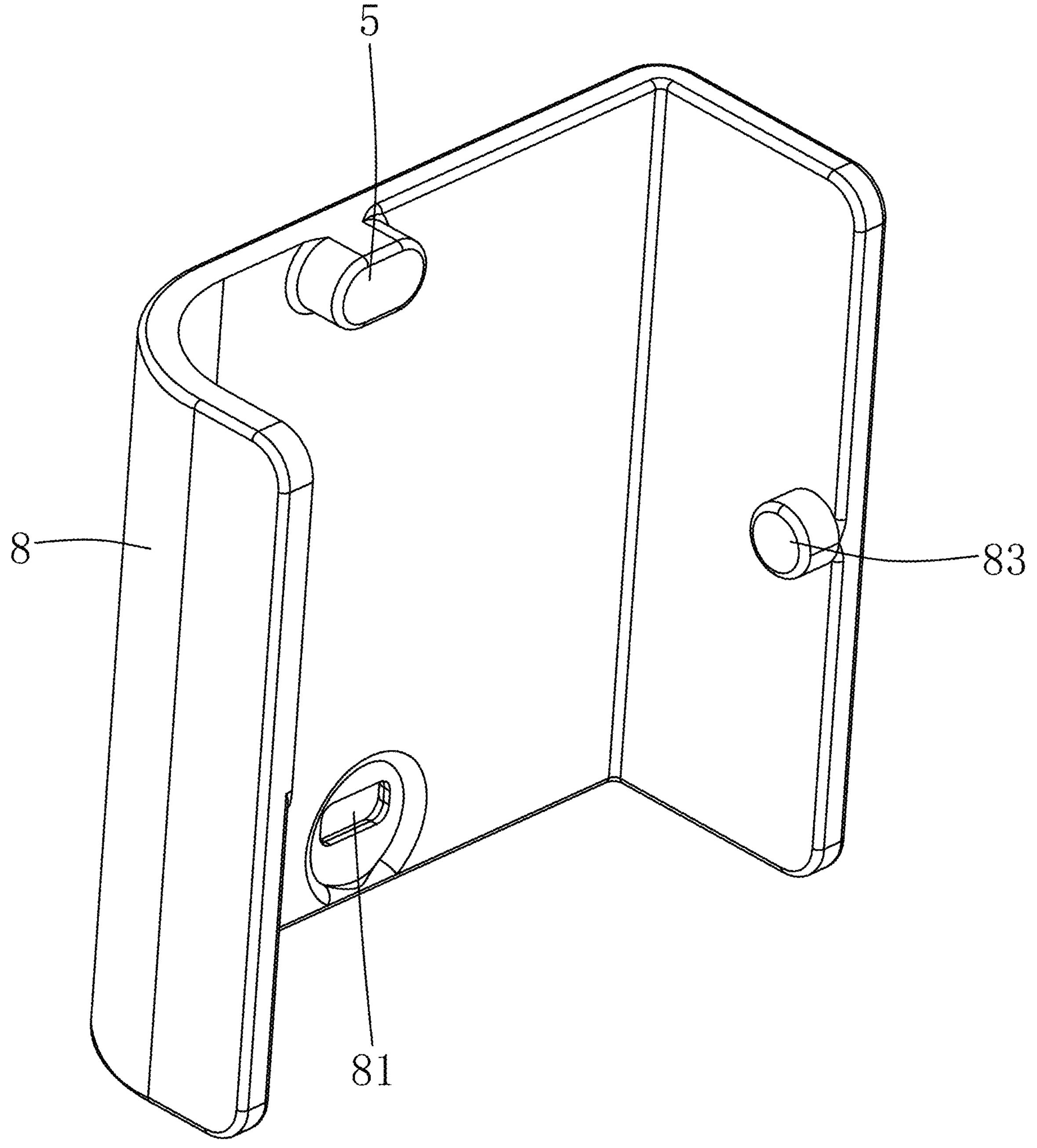
FIG. 9 is a schematic structural diagram of the pressing plate in FIG. 7.
Figure 10:
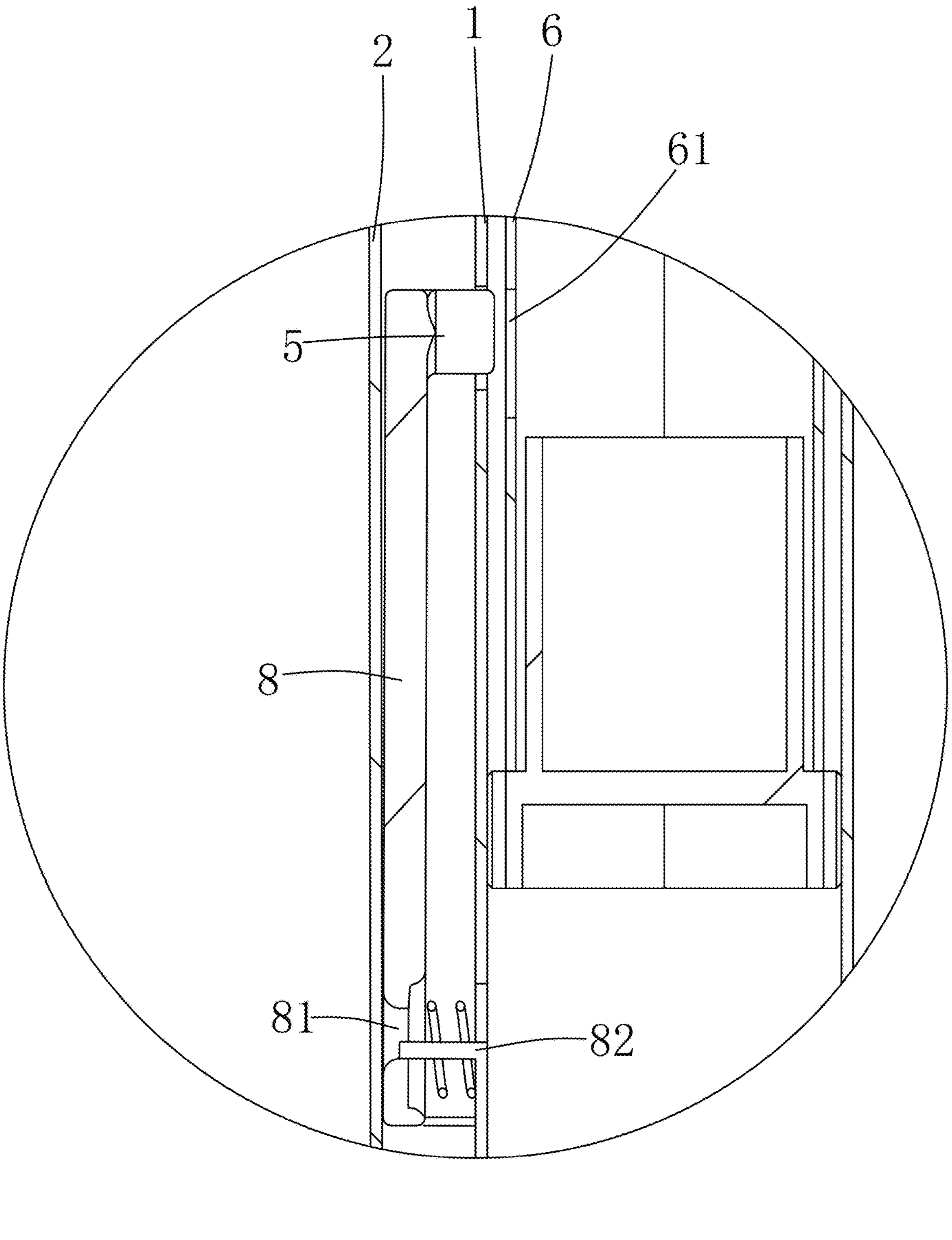
FIG. 10 is a sectional view of the pressing plate after the front and rear tubes are closed.

As shown in FIGS. 1 and 2, this embodiment discloses a single handrail telescopic ladder, which includes two pairs of front tubes 1 and two pairs of rear tubes 2. The front tubes 1 and the rear tubes 2 are hinged to each other at a top to form a zigzag folding structure. Pedals 3 configured for a user to step on are provided between adjacent front tubes 1 and adjacent rear tubes 2. A hollow single handrail tube 6 can be inserted and retracted into one of the front tubes 1. The single handrail tube 6 is used for a user to grip when climbing up or down a ladder. At a top position of the front tubes, there is a fixing hole 11 that penetrates both inside and outside, and at a corresponding position of the single handrail tube 6, there is a locking hole 61 that corresponds to the fixing hole 11.

An installation seat 4 is fixedly provided on an outer wall of the front tubes 1 with the single handrail tube 6, and the rear tubes 2 are hinged to the installation seat 4. Locking members 5 are provided on an inner wall of the installation seat 4, and the locking members 5 is a pull ring pin. The pull ring pin includes a circular pull ring 51 provided on an outer side of the installation seat 4, and a pin shaft 52 provided on an inner side of the installation seat 4 and insertable into the fixing hole 11 and the locking hole 61. The pin shaft 52 includes a thin section 521 and a thick section 522 from outside to inside, and a step surface 523 is formed between the thin section 521 and the thick section 522. The elastic member is a spring 53, the spring 53 is provided inside the installation seat 4. The spring 53 is sleeved onto the thin section 521, and one end of the spring 53 is in contact with the step surface 523, and the other end thereof is in contact with an inner wall of the installation seat 4, thereby applying a pre-tension force to the entire pull ring pin towards an inner side of the ladder.

When the user pulls out the single handrail tube, the pin shaft 52 will pass through the fixing hole 11 and the locking hole 61 under an action of the spring 53, thereby supporting the single handrail tube 6 and maintaining its extended state. When the single handrail tube 6 is needed for storage, the circular pull ring 51 is simply pulled outward to realize the unlocking.

As shown in FIGS. 3, 4, 5, and 6, in an implementation mode, a button 7 is provided on an inner wall of the installation seat 4. A middle of the button 7 is provided with an arc-shaped protrusion 75 extending towards the installation seat 4. An outer side of a front end of the arc-shaped protrusion 75 is provided with a chamfered slope 74, and a middle end thereof is provided with a shaft hole 71. The installation seat 4 is provided with an accommodation space configured for accommodating the button 7, and a rotating shaft 41 passing through the shaft hole 71 is provided on a wall of the accommodation space, thereby enabling the button 7 to rotate around its middle. An upper end of the button 7 is provided with the locking members 5 that can be inserted into the fixing hole 11 and the locking hole 61, and a lower end thereof interacts with a spring 53. The spring 53 applies an elastic force to a lower end of the button 7, and the button 7 is caused to rotate around its center and the locking members 5 is driven to have a pre-tension force towards a direction passing through the fixing hole 11 and the locking hole 61.

A guide structure is provided between the lower end of the button 7 and the installation seat 4. The guide structure includes a guide hole 73 on an inner side of the button 7 configured to insert one end of the spring 53, and a guide protrusion 72 provided inside the installation seat 4 and configured for the other end of the spring 53 to be sleeved.

When the user pulls out the single handrail tube, the locking members 5 will pass through the fixing hole 11 and the locking hole 61 under an action of the spring 53, thereby supporting the single handrail tube 6 and maintaining its extended state. When the single handrail tube 6 is needed for storage, the button 7 is simply pressed to realize the unlocking.

As shown in FIGS. 7 to 10, in an implementation mode, a pressing plate 8 is provided on a wall of the front tubes 1 facing the rear tubes 2, and an overall shape of the pressing plate 8 is a U-shaped structure that matches an outer wall contour of the front tubes 1. Convex shafts 83 extending inward are provided in a middle of two opposite side walls of the U-shaped pressing plate 8. The convex shafts 83 are inserted into the front tubes 1 to achieve a rotational connection between the pressing plate 8 and the front tubes 1. An inner side of an upper end of the pressing plate 8 is provided with the locking members 5, and the locking members 5 are integrally formed with the pressing plate 8. An inner side of a lower end of the pressing plate 8 is provided with a spring 53, and the spring 53 applies an elastic force to the pressing plate 8, and the pressing plate 8 is caused to rotate around its middle and the locking members 5 at the upper end is driven to have a pre-tension force that moves in a direction of passing through the fixing hole 11 and the locking hole 61.

One side of the front tubes 1 corresponding to the pressing plate 8 is provided with a limit protrusion 82 extending towards the pressing plate 8. The spring 53 is sleeved onto the limit protrusion 82, and the pressing plate 8 is provided with an avoidance hole 81 at a position corresponding to the limit protrusion 82. A length of the limit protrusion 82 is less than or equal to a thickness of the pressing plate 8. After the front tubes 1 and the rear tubes 2 are combined to compress the pressing plate 8, the limit protrusion 82 will enter the avoidance hole 81.

After the ladder is folded, the front tubes 1 and the rear tubes 2 are combined to compress the pressing plate 8 to overcome the pre-tension force of the spring 53, so that the locking members 5 can at least exit from the locking hole 61 of the single handrail tube 6, thereby completing an unlocking of the single handrail tube 6 and achieving a storage of the single handrail tube 6. When the ladder is unfolded, the user can directly pull out the single handrail tube 6 outward. When the locking hole 61 is moved to align with the fixing hole 11, the locking members 5 will be instantly inserted into the locking hole 61, thus completing a locking of the single handrail tube 6.

Figure 11:
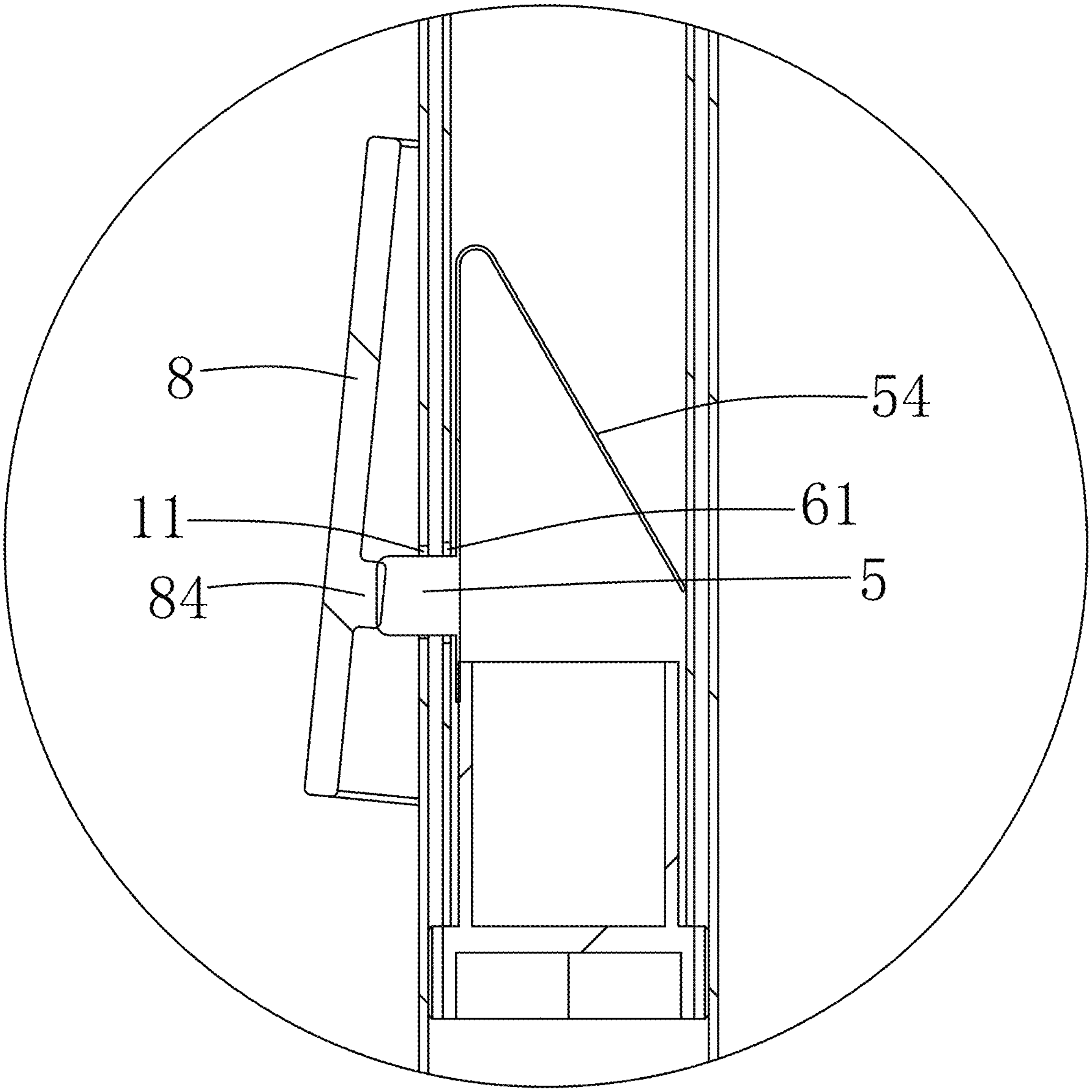
FIG. 11 is a sectional view of the pressing plate of still one embodiment.

As shown in FIG. 11, in an implementation mode, an upper end of the pressing plate 8 can be rotatably connected to the front tubes 1 by providing the convex shafts 83. An inner side of the lower end of the pressing plate 8 is provided with a contact protrusion 84 extending towards the front tubes 1. The locking members 5 and the elastic member are located inside the single handrail tube 6. The locking members 5 passes through the locking hole 61 and the fixing hole 11 from inside to outside and extends to the outside of the front tubes 1 to contact with the contact protrusion 84. In an implementation mode, the elastic member adopts a V-shaped leaf spring 54, and the locking members 5 are protrusions that are provided on the leaf spring 54 and integrally formed with the leaf spring 54.

When the ladder is folded, the front tubes 1 and the rear tubes 2 are combined to compress the pressing plate 8, so that the contact protrusion 84 compresses the locking members 5 inward to overcome the pre-tension force of the leaf spring 54, and the locking members 5 are caused to at least exit from the fixing hole 11 of the front tubes 1. Thus, unlocking the single handrail tube 6 and achieving storage of the single handrail tube 6.

What is claimed is:

1. A single handrail telescopic ladder, comprising:

two front tubes and two rear tubes, wherein one of the two front tubes and one of the two rear tubes at the same side are hinged at a top; pedals for a user to step on are provided between adjacent front tubes and between adjacent rear tubes;

a single handrail tube, which is scalability inserted into one of the two front tubes;

one of the two front tubes is provided with a fixing hole that penetrates both inside and outside, and a locking hole corresponding to the fixing hole is provided at a corresponding position of the single handrail tube;

a locking member, which simultaneously passes through the fixing hole and the locking hole after the single handrail tube is pulled out from one of the two front tubes to a predetermined position, thereby achieving a fixation between the single handrail tube and one of the two front tubes; and an elastic member, which directly or indirectly acts on the locking member and provides a pre-tension force for the locking member towards a direction passing through the fixing hole and the locking hole;

when the locking member is unlocked, the locking member exits from the fixing hole and locking hole, allowing the single handrail tube to automatically retract into one of the two front tubes;

wherein an installation seat is fixedly provided on an outer wall of one of the two front tubes, and a button is provided on the installation seat, wherein the elastic member is a spring;

wherein a guide structure is provided between the button and the installation seat, and the guide structure is provided with a guide hole configured for one end of the spring to insert and a guide protrusion configured for the other end of the spring to be sleeved.

2. The single handrail telescopic ladder according to claim 1, wherein a middle of the button is provided with an arc-shaped protrusion extending towards the installation seat, an outer side of a front end of the arc-shaped protrusion is provided with a chamfered slope, a middle of the arc-shaped protrusion is provided with a rotating shaft hole, the installation seat is provided with a rotating shaft passing through the rotating shaft hole, so that the button is rotatably connected to the installation seat;

one end of the button is provided with the locking member that is inserted into the fixing hole and the locking hole, and the other end of the button interacts with the elastic member, wherein the spring applies elastic force to the other end of the button, so that the button is caused to rotate around a middle and the locking members is driven to have a pre-tension force to move in a direction passing through the fixing hole and the locking hole.

* * * * *